United States Patent
Tuchiya

(10) Patent No.: US 9,413,210 B2
(45) Date of Patent: Aug. 9, 2016

(54) BRUSHLESS MOTOR

(71) Applicant: Tokyo Parts Industrial Co., Ltd., Gunma-ken (JP)

(72) Inventor: Masahisa Tuchiya, Gunma-ken (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 161 days.

(21) Appl. No.: 14/313,097

(22) Filed: Jun. 24, 2014

(65) Prior Publication Data
US 2015/0061442 A1 Mar. 5, 2015

(30) Foreign Application Priority Data

Aug. 29, 2013 (JP) ................................. 2013-178067

(51) Int. Cl.
| | |
|---|---|
| *H02K 11/00* | (2006.01) |
| *H02K 29/08* | (2006.01) |
| *H02K 21/22* | (2006.01) |
| *H02K 1/27* | (2006.01) |

(52) U.S. Cl.
CPC ............ *H02K 11/0021* (2013.01); *H02K 29/08* (2013.01); *H02K 1/2786* (2013.01); *H02K 21/22* (2013.01); *H02K 2213/03* (2013.01)

(58) Field of Classification Search
CPC H02K 11/0021; H02K 11/0015; H02K 29/08
USPC .......................... 310/68 A, 68 B, 68 D, 68 E
See application file for complete search history.

(56) References Cited

U.S. PATENT DOCUMENTS

| | | | | |
|---|---|---|---|---|
| 5,216,557 | A * | 6/1993 | Elsaesser et al. | 360/99.08 |
| 6,081,058 | A * | 6/2000 | Suzuki et al. | 310/156.45 |
| 6,476,528 | B2 | 11/2002 | Sekine | |
| 8,067,870 | B2 * | 11/2011 | Kobayashi et al. | 310/156.05 |
| 2001/0019230 | A1 * | 9/2001 | Furuki | 310/68 B |
| 2001/0045786 | A1 | 11/2001 | Sekine | |
| 2005/0212367 | A1 * | 9/2005 | Blase et al. | 310/68 B |

FOREIGN PATENT DOCUMENTS

JP 2001-339889 12/2001

* cited by examiner

*Primary Examiner* — Hanh Nguyen
(74) *Attorney, Agent, or Firm* — Jordan and Hamburg LLP

(57) ABSTRACT

A rotor type brushless motor comprises a drive magnet having an indexing pole part that extends on one axial side thereof. This indexing pole part is formed at least in the range from the circumferential center of one north pole to the circumferential center of one adjacent south pole, and over no greater than the range from one circumferential end of the one north pole to the other circumferential end of the one south pole. A magnetic flux detector is arranged at a position axially facing the indexing pole part.

4 Claims, 2 Drawing Sheets

BRUSHLESS MOTOR

BACKGROUND OF THE INVENTION

The present invention relates to an outer-rotor type brushless motor provided with an index detection mechanism.

Outer-rotor type brushless motors are used as spindle motors for rotationally driving color wheels in projectors, polygon mirrors in printers and the like. Brushless motors of this sort are known in which an index detection mechanism is provided, which outputs a position signal of one pulse for each rotation (index signal) so as to detect the rotational position of the rotor.

For example, in the brushless motor described in Japanese Patent Laid-Open Publication No. 2001-339889, windows are provided at multiple locations on a rotor yoke, and protrusions are provided on a portion of a ring-shaped drive magnet that fits in the inner periphery of the rotor yoke, which protrude radially outward through the windows. Here, one of these protrusions is provided at a position that straddles a north and south pole of the drive magnet, and a magnetic flux detection element is arranged at a position facing the protrusion.

With the brushless motor described in Japanese Patent Laid-Open Publication No. 2001-339889, when the rotor yoke rotates, the magnetic flux from the protrusion is detected by the magnetic flux detection element, and an index sign& is output consisting of one pulse for each rotation of the rotor yoke.

Furthermore, in the brushless motor described in Japanese Patent Laid-Open Publication No. 2001-339889, because a window is provided in the rotor yoke and a portion of the drive magnet protrudes radially outward from this window, the motor efficiency tends to decrease if this window is overly large. Consequently, the one protrusion mentioned above is provided at a position straddling the north and south poles of the drive magnet, formed within a narrowly limited range from the border between the north and south poles (a range of approximately ¼ of each of the magnetic poles).

However, because the magnetic flux density is lower in the region of the border between the north and south poles than in the circumferentially central regions of the poles, the magnetic flux that is detected by the magnetic flux detection element tends to be influenced not only by changes in the magnetic field of the drive magnet, which depends on the ambient temperature, but also by variations in the relative positions of the protrusion and the magnetic flux detection element, and by magnetic disturbances, Consequently, in order to obtain a highly reliable index signal there is a need for high dimensional accuracy in the multiple components that make up the motor, and a need for highly accurate positioning of the protrusion and the magnetic flux detection element, which is a problem in so much as this increases component costs and lowers assembly work efficiency.

SUMMARY OF THE INVENTION

One or more embodiments of the present invention provide a brushless motor that solves the aforementioned problems included in the prior art, allowing a highly reliable index signal to be produced while limiting component cost increases and losses in assembly work efficiency.

The outer-rotor type brushless motor according to the present invention comprises: a rotary shaft; a rotor case that rotates united with said rotary shaft; a cylindrical drive magnet magnetized with alternating north and south poles in the circumferential direction, which is fixed inside the rotor case; and a magnetic flux detector. Furthermore, the drive magnet has an indexing pole part, which extends on one axial side thereof, at least in the range from the circumferential center of one north pole to the circumferential center of one south pole that is adjacent to that one north pole, and over no greater than the range from one circumferential end of that one north pole to the other circumferential end of that one south pole. The magnetic flux detector is disposed at a position axially facing the indexing pole part By virtue of one or more embodiments of the present invention, because of a configuration wherein the index signal is output using magnetic flux from the circumferential centers of the magnetic poles where magnetic flux density is high, the index signal is not readily subject to the influence of changes in the ambient temperature or magnetic disturbances. Consequently, it is possible to relax the dimensional precision of the components from which the brushless motor is made, and the relative positioning precision between the indexing pole part and the magnetic flux detector, which limits increases in component costs and losses in assembly work efficiency, and allows a highly reliable index signal to be produced.

DETAILED DESCRIPTION OF THE PREFERRED EMBODIMENTS

Figure 1:
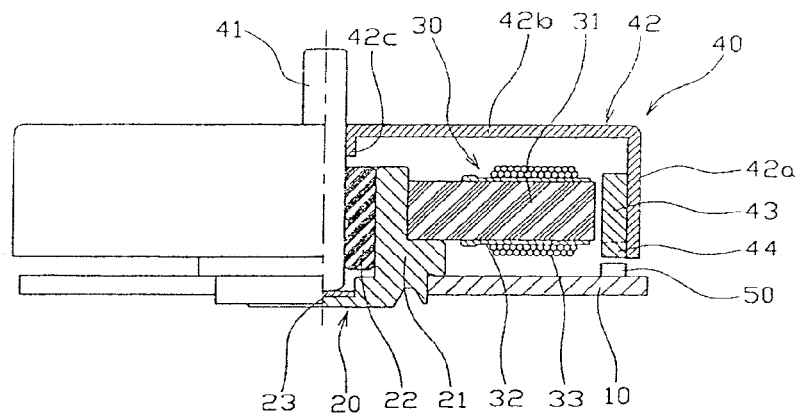
FIG. 1 is a partially cutaway side view of a brushless motor according to one mode of embodiment of the present invention.

Hereafter, modes of embodiment of the present invention are described in detail with reference to the drawings. Note that the aspects and technical features of the present invention are not limited to those described hereafter, and are to be understood based on the descriptions throughout the specification and in the drawings, or based on the inventive ideas that can be grasped by the skilled artisan on the basis of these descriptions.

A brushless motor according to one mode of embodiment of the present invention will be described using FIG. 1 and FIG. 2. This exemplary brushless motor is an outer-rotor type brushless motor wherein the rotor rotates at the radial exterior of a stator, and principally comprises a mounting board 10, a bearing unit 20, a stator unit 30 and a rotor unit 40.

The mounting board 10 is constituted by a so-called iron substrate, on the surface of which a printed circuit is formed, or is constituted by a substrate wherein a printed circuit board has been overlaid on an iron substrate.

The bearing unit 20 comprises a bearing holder 21, a bearing 22 and a thrust plate 23. The bearing holder 21 holds the bearing 22 fixed in place at the interior thereof, and an integrally molded part made from a resin material having excellent oil resistance, heat resistance, dimensional stability and the like, a cut part made from a metal material, a drawn part or the like can be used for the bearing holder 21, but in this example a cut brass part is used. This bearing holder 21 is press fit into a through-hole provided in the mounting board 10, so as to be fixed in place by way of press fitting therein. The bearing 22 is a radial bearing that supports a rotary shaft 41 in free rotation, and is made from hollow cylindrical sintered metal impregnated with lubricating oil. The thrust plate 23 is made from an abrasion resistant resin plate, and supports the bottom end of the rotary shaft 41.

The stator unit 30 comprises a stator core 31, a core cover 32 and a coil 33. The stator core 31 is made from a planar core laminate, on which a plurality of salient poles are formed, and is fixed in place disposed on a stepped part formed at the outer periphery of the bearing holder 21. The core cover 32, which is made from an insulating resin, is disposed on the surface of the stator core 31, and the coil 33 is wound on, with the core cover 32 therebetween.

The rotor unit 40 comprises a rotary shaft 41, a rotor case 42, which rotates united with this rotary shaft 41, and a drive magnet 43, which is fixed in place on the inside of the rotor case 42. The rotary shaft 41 is supported in free rotation by the bearing 22, the bottom thereof being supported by the thrust plate 23. The rotor case 42 is formed a magnetic sheet in the shape of a cap, and comprises a cylindrical portion, 42a formed in a cylindrical shape concentric with the rotary shaft 41, and a top portion 42b that covers the top of this cylindrical portion 42a. A bearing part 42c is formed in the center of the top portion 42b, so that the rotary shaft 41 is pressed in and held in place by this bearing part 42c.

A cylindrical drive magnet 43 is fitted so as to be held in place at the inside of the cylindrical portion 42a of the rotor case 42, radially facing the salient poles on the stator core 31. As shown in FIG. 2, this drive magnet 43 is magnetized into 6 alternating north and south poles in the circumferential direction, with a pole pitch of 30°. The magnetization of the poles of the drive magnet 43 is a so-called sinusoidal magnetization or trapezoidal wave magnetization, such that the magnetic flux density is higher in the circumferentially central portions than in the circumferential end portions of the poles (in the vicinity of the pole boundaries). Note that, in FIG. 2, the pole boundary regions are indicated by the dashed lines.

Figure 2A:
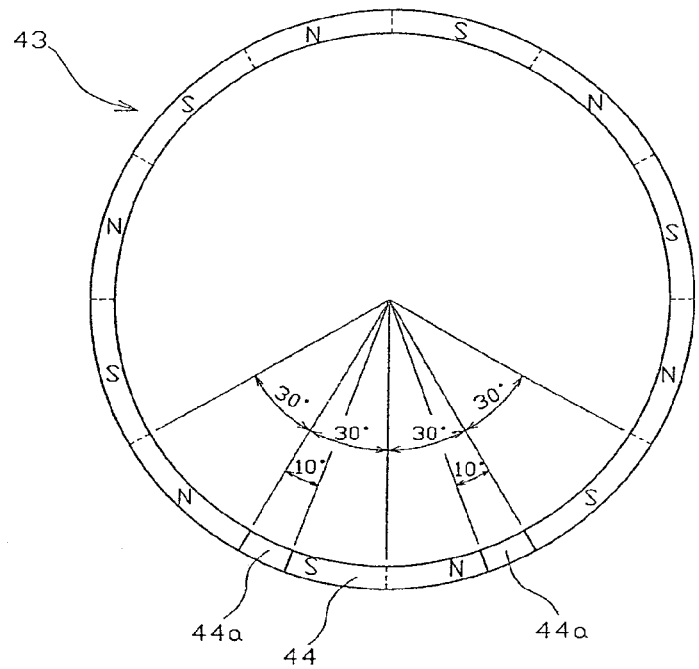
FIG. 2(*a*) and FIG. 2(*b*) show a drive magnet in the brushless motor in FIG. 1, wherein FIG. 2(*a*) is a bottom view of the drive magnet and FIG. 2(*b*) is a side view of the drive magnet.
Figure 2B:
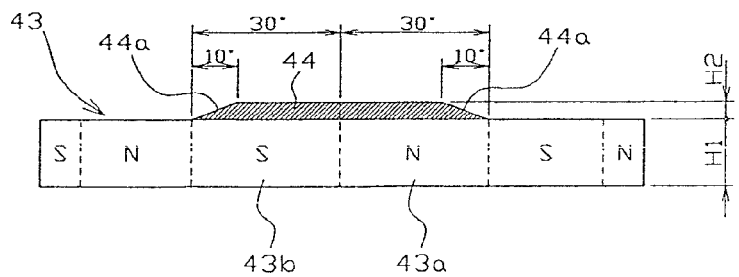
Figure 3A:
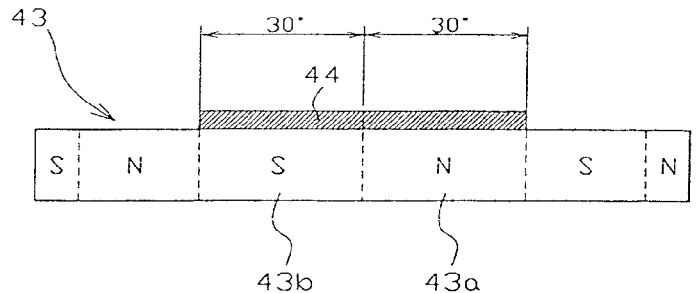
FIG. 3(*a*) to FIG. 3(*d*) are side views showing another example of a drive magnet that can be used in the present invention.
Figure 3B:
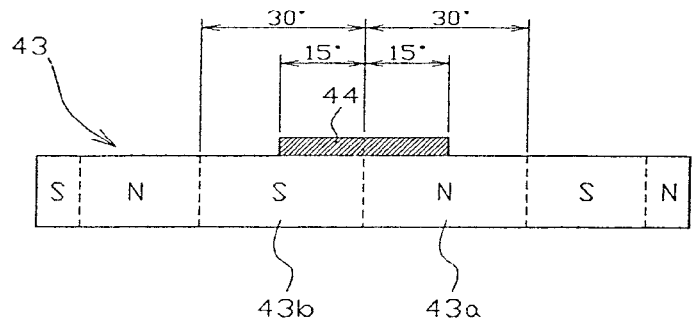
Figure 3C:
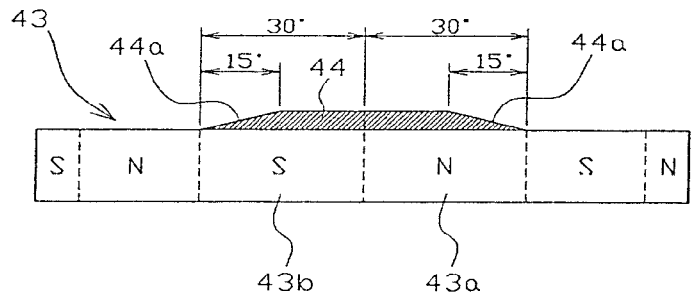
Figure 3D:
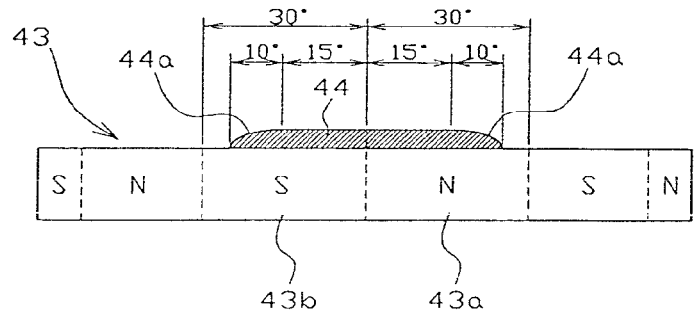

The drive magnet 43 comprises an indexing pole part 44 (the shaded portion in FIG. 2(b)), which extends on one axial side thereof (the bottom side in FIG. 1).

The indexing pole part 44 is formed at least in a range from the circumferential center of one north pole to the circumferential center of one south pole that is circumferentially adjacent to that one north pole. If the range is narrower than this in the circumferential direction, it is not possible to sufficiently make use of the magnetic flux from the central region of the poles, where the magnetic flux density is high, and the effect of the present invention cannot be sufficiently produced.

Furthermore, the indexing pole part 44 is formed over a range from one circumferential end of one north pole to the other circumferential end of one south pole that is circumferentially adjacent to that north pole. If the range is wider than this in the circumferential direction, the possibility of two or more index signal pulses being output for each revolution increases, which may present an impediment to detection of the rotational position of the rotor.

As shown in FIG. 2, the indexing pole part 44 in this example extends in the axial direction in the range from one circumferential end of one north pole 43a to the other circumferential end of an adjacent south pole 43b (expressed as mechanical angle, a 60° range). Furthermore, the indexing pole part 44 in this example comprises sloped portions 44a, which are sloped from the two circumferential ends toward the circumferential center. These sloped portions 44a are formed in a range that does not extend to the circumferential centers of the poles, and in this example the sloped portions 44a are provided in a range of 10°, as a mechanical angle.

Note that the sloped portions 44a are not limited to straight-line slopes, and may be sloped with any curve.

The height dimension H1 of the drive magnet 43 in this example is approximately 4 mm, and the height dimension H2 of the indexing pole part 44 is approximately 1 mm. Furthermore, as shown in FIG. 1, the bottom edge of the indexing pole part 44 does not protrude beyond the bottom edge of the rotor case 42, being approximately level with the bottom edge of the rotor case 42.

A magnetic flux detector 50 is disposed on the mounting board 10 so as to face the indexing pole part 44 of the drive magnet 43 in the axial direction (the vertical direction in FIG. 1). In this example, a Hall element and a Hall IC with a signal conversion circuit are used for the magnetic flux detector 50. The Hall element is an electromagnetic conversion element employing the Hall effect, which outputs an electrical signal (voltage signal) that varies with the flux density of the magnetic field produced by the indexing pole part 44. The signal conversion circuit outputs an index signal with one pulse for each revolution of the rotor unit 40, on the basis of the output signal from the Hall element, allowing the rotational position of the rotor 40 to be detected.

Note that, well-known methods can be used for the index signal output operations in the signal conversion circuit, such as a method wherein the voltage signal from the Hall element and a predetermined reference voltage are compared, and an index signal is output comprising pulses that based on the component that is higher than the reference voltage, or a method wherein an index signal is output comprising pulses coinciding with crossing zero after the voltage signal from the Hall element exceeds the reference voltage.

With the brushless motor in this example, which is configured as described above, because the indexing pole part 44 protrudes in the axial direction rather than the radial direction, it is not necessary to provide a window (opening) in the rotor case 42, allowing the decrease in the motor efficiency to be limited.

Furthermore, with a brushless motor provided with an ordinary index detection mechanism, the gap between the indexing pole part 44 and the magnetic flux detector 50 is set very narrow, at approximately 1 mm, but this gap tends to vary between individual products due to the cumulative dimensional errors in the axial direction of the multiple components that make up the motor. Consequently, in consideration for this variation in the gap, it is necessary to design this gap so as to be somewhat large, so that the indexing pole part 44 and the magnetic flux detector 50 do not touch. However, the larger the gap between the indexing pole part 44 and the magnetic flux detector 50, the smaller the electrical signal produced by the magnetic field generated by the indexing pole part 44 will be.

Accordingly, an indexing pole part that is formed only within a small range from the boundary between a north and south pole, where the magnetic flux density is less than in the circumferentially central portions of the poles, is readily influenced by magnetic disturbance, due to decreases in the magnetic field caused by variations in the ambient temperature when the motor is used, and the variations in the gap described above. Consequently, the index signal fails to be output, or the position at which the index signal is generated varies, such that it is not possible to accurately detect the rotational position of the rotor.

Here, with the brushless motor in this example, the protrusion range of the indexing pole part 44 is established at least in the range of the circumferential center of one north pole 43a to the circumferential center of one south pole 43b that is circumferentially adjacent to that north pole 43a, and over no greater than the range of one circumferential and of that north pole 43*a* to the other circumferential end of that south pole 43*b,* such that the index signal is output using the magnetic flux from the central regions of the poles, where the magnetic flux density is high. Consequently, with the brushless motor in this example, it is possible to relax the relative positioning accuracy between the indexing pole part 44 and the magnetic flux detector 50, allowing the motor assembly work efficiency to be improved, while allowing a highly reliable index signal to be produced.

Furthermore, with the brushless motor in this example, by forming sloped portions 44*a* on the indexing pole part 44, it is possible to effectively prevent chipping and cracking of the drive motor 43. Furthermore, by forming the sloped portions 44*a* so as not to reach the circumferential centers of the poles, it is possible to produce the index signal with maximum employment of the magnetic field generated in the circumferential central portions, where the magnetic flux density is great, while preventing chipping and cracking of the drive magnet 43.

One mode of embodiment of the present invention has been described above, but the present invention is not limited to mode of embodiment described above, and can be suitably changed within the scope of the gist of the invention.

For example, various configurations are possible for the drive magnet, such as shown in FIG. 3. Note that the drive magnet shown in FIG. 3 hose 12-pole magnetization, but there is no limit on the number of poles.

The drive magnet 43 shown in FIG. 3(*a*) is an example in which sloped portions are not provided, and the indexing pole part 44 is formed over the maximum range. The drive magnet 43 shown in FIG. 3(*b*) is an example in which sloped portions are not provided, and the indexing pole part 44 is formed over the minimum range. The drive magnet 43 shown in FIG. 3(*c*) is an example in which the indexing pole part 44 is formed over the maximum range and two sloped portions 44*a* are provided up to the circumferential center of each of the poles. The drive magnet 43 shown in FIG. 3(*d*) is an example in which two curved sloped portions 44*a* are provided up to the circumferential center of each of the poles.

In cases where drive magnets such as those in FIG. 3(*a*) to (*d*) are used, it is likewise possible to output an index signal using the magnetic flux from the central portions of the poles, where the magnetic flux density is high, and it is likewise possible to produce a highly reliable index signal which is unlikely to be influenced by magnetic disturbances.

What is claimed is:

1. An outer-rotor type brushless motor comprising:
a rotary shaft;
a rotor case that rotates united with said rotary shaft;
a cylindrical drive magnet magnetized with alternating north and south poles in the circumferential direction, which is fixed inside said rotor case; and
a magnetic flux detector,
wherein said drive magnet has an indexing pole part, which extends on one axial side thereof, at least in the range from the circumferential center of one north pole to the circumferential center of one south pole that is adjacent to said one north pole, and over no greater than the range from one circumferential end of said one north pole to the other circumferential and of said one south pole; and
said magnetic flux detector is arranged at a position axially facing said indexing pole part.

2. The outer-rotor type brushless motor recited in claim 1, wherein said indexing pole part has sloped portions, which slope from the two circumferential ends toward the circumferential center.

3. The outer-rotor type brushless motor recited in claim 2, wherein said sloped portions are formed in ranges that do not reach the circumferential centers of the poles.

4. The outer-rotor type brushless motor recited in claim 1, wherein the bottom edge of said indexing pole part is arranged substantially level with the bottom edge of said rotor case.

\* \* \* \* \*